United States Patent
Hwang et al.

(10) Patent No.: US 8,761,214 B2
(45) Date of Patent: Jun. 24, 2014

(54) APPARATUS FOR STABILIZING SECOND HARMONIC PULSE OUTPUT IN A LASER SYSTEM OPERATING BY PULSES

(75) Inventors: Haelyung Hwang, Goyang-Si (KR); Seunghwan Kong, Yangcheon-Gu Seoul (KR); Huicheol Lee, Goyang-Si (KR)

(73) Assignee: Lutronic Corporation, Gyeonggi-do (KR)

( * ) Notice: Subject to any disclaimer, the term of this patent is extended or adjusted under 35 U.S.C. 154(b) by 0 days.

(21) Appl. No.: 13/266,706

(22) PCT Filed: Apr. 28, 2010

(86) PCT No.: PCT/KR2010/002680
§ 371 (c)(1),
(2), (4) Date: Oct. 27, 2011

(87) PCT Pub. No.: WO2010/126300
PCT Pub. Date: Nov. 4, 2010

(65) Prior Publication Data
US 2012/0044963 A1 Feb. 23, 2012

(30) Foreign Application Priority Data

Apr. 28, 2009 (KR) ........................ 10-2009-0037134

(51) Int. Cl.
*H01S 3/10* (2006.01)
(52) U.S. Cl.
USPC .................................. 372/22; 372/21; 372/30
(58) Field of Classification Search
CPC ....................................................... H01S 3/109
USPC ................................................ 372/21, 22, 30
See application file for complete search history.

(56) References Cited

U.S. PATENT DOCUMENTS 6,322,220 B1 * 11/2001 Sano et al. .................... 359/615
6,347,101 B1 * 2/2002 Wu et al. ......................... 372/18

(Continued)

FOREIGN PATENT DOCUMENTS

JP 7-120799 A 5/1995
JP 9-293916 A 11/1997

(Continued)

OTHER PUBLICATIONS

International Search Report w/translation from PCT/KR2010/002680 dated Nov. 24, 2010 (4 pages).

(Continued)

*Primary Examiner* — Yuanda Zhang
(74) *Attorney, Agent, or Firm* — Osha Liang LLP

(57) ABSTRACT

The present invention relates to an apparatus for stabilizing second harmonic wave pulse output in a laser system operating by pulses. The apparatus of the present invention comprises: a pulse laser oscillating unit (110) which outputs a laser pulse; a nonlinear crystal (120) which converts the laser pulse of a first wavelength output by the pulse laser oscillation unit (110) into a second harmonic wave with a value that is half of the first wavelength, and outputs the converted second harmonic wave; and an optical absorption filter (130) which absorbs a portion of the energy of the converted second harmonic laser pulse from the nonlinear crystal (120) to output the second harmonic wave with a lower energy. The thus-configured apparatus of the present invention supplies a fundamental wave in a stable state and having a small PTP value and high level energy to the nonlinear crystal, in order to obtain the second harmonic wave which is in a more stable state and has a small PTP value and a variety of energies.

10 Claims, 5 Drawing Sheets

(56) References Cited

U.S. PATENT DOCUMENTS

| | | | |
|---|---|---|---|
| 2002/0001321 A1* | 1/2002 | Perry | 372/22 |
| 2002/0061032 A1* | 5/2002 | Miura et al. | 372/4 |
| 2005/0243876 A1* | 11/2005 | Kung | 372/21 |
| 2008/0279248 A1* | 11/2008 | Sung | 372/101 |

FOREIGN PATENT DOCUMENTS

| | | |
|---|---|---|
| JP | 2007-316339 A | 12/2007 |
| KR | 10-2008-0023579 A | 3/2008 |

OTHER PUBLICATIONS

Patent Abstracts of Japan Publication No. 09-293916 dated Nov. 11, 1997 (1 page).

Patent Abstracts of Japan Publication No. 07-120799 dated May 12, 1995 (1 page).

Patent Abstracts of Japan Publication No. 2007-316339 dated Dec. 6, 2007 (1 page).

KIPO Abstract Publication No. 1020080023579A dated Mar. 14, 2008 (1 page).

* cited by examiner

APPARATUS FOR STABILIZING SECOND HARMONIC PULSE OUTPUT IN A LASER SYSTEM OPERATING BY PULSES

TECHNICAL FIELD

The present invention relates to a method of stabilizing second harmonic wave pulse output and, more particularly, to an apparatus for stabilizing second harmonic wave laser pulse output in a laser system operated by pulses, which is suitable for obtaining a second harmonic wave having a low Pulse to Pulse (PTP) value (that is, a variety of more stabilized energies) by making a fundamental wave, having a low PTP value and high stabilized energy, incident on non-linear crystals.

BACKGROUND ART

FIG. 1 is a conceptual diagram showing a process of converting the wavelength of a laser pulse, outputted from a common pulse laser oscillator, into half the wavelength using non-linear crystals.

As shown in FIG. 1, the wavelength of a laser pulse outputted from the common pulse laser oscillator (not shown) are converted into half the wavelength through non-linear crystals, such as KTP ($KTiOPO_4$), LBO ($LiB_3O_5$), or BBO ($BaB_2O_4$). In the example shown in FIG. 1, a wavelength of 1064 nm is converted into a wavelength of 532 nm, which is called frequency doubling or generation of harmonic wave.

A wavelength before being converted is called a fundamental wave. A wavelength reduced by half through conversion is called a second harmonic wave.

Lasers driven by pulses indicate the degree of a change in energy between outputted energies as PTP stability. A decrease in the PTP value indicates a more stable later.

In general, the PTP values of lasers are high when output energy is low, and the PTP values of lasers are low when output energy is high, unless the lasers have special constructions.

The second harmonic wave being generated has a value about twice greater than the PTP value of the fundamental wave and thus has a problem in that the PTP value is increased.

Accordingly, if the fundamental wave of low level energy is incident on non-linear crystals, the second harmonic wave having a very high PTP is obtained because the PTP value of the fundamental wave is high. Accordingly, there is a problem in that the output energy of the second harmonic wave is greatly changed.

DISCLOSURE

Technical Problem

Accordingly, the present invention has been made in view of the above problems, and it is an object of the present invention to provide an apparatus for stabilizing second harmonic wave pulse output in a laser system operated by pulses, which can obtain a second harmonic wave having a low PTP value (that is, more stabilized energy of various states) by making a fundamental wave, having high level energy of a more stabilized state and having a low PTP value, incident on non-linear crystals by constructing a light absorption filter in the rear of non-linear crystals.

Furthermore, it is another object of the present invention to provide an apparatus for stabilizing second harmonic wave pulse output in a laser system operated by pulses, which enables a user to select whether to output a laser pulse of high level energy which is converted through non-linear crystals or to output a laser pulse of low level energy using a light absorption filter.

Technical Solution

To achieve the above objects, according to an aspect of the present invention, there is provided an apparatus for stabilizing second harmonic wave pulse output in a laser system, including a pulse laser oscillator for outputting a laser pulse; non-linear crystals for converting the laser pulse of a first wavelength, outputted from the pulse laser oscillator, a laser pulse of a second harmonic wave having half the length of the first wavelength and outputting the laser pulse of the second harmonic wave; and a light absorption filter for outputting a second harmonic wave of a lower energy by absorbing some of the energy of the laser pulse having the second harmonic wave which has been converted by the non-linear crystals.

The apparatus for stabilizing second harmonic wave pulse output in a laser system further includes moving means for moving the light absorption filter and selectively placing the light absorption filter on a laser path and a control unit for controlling the moving means.

Advantageous Effects

In accordance with the present invention, the apparatus for stabilizing second harmonic wave pulse output in a laser system operated by pulses has the following advantages.

First, the light absorption filter is formed in the rear of the non-linear crystals. Accordingly, there is an advantage in that a second harmonic wave having a low PTP value and having energy of various levels can be obtained by making a fundamental wave of a high level energy, having a low PTP value, incident on the non-linear crystals.

Second, there is an advantage in that a user can select whether to output a second harmonic wave laser pulse of a high level energy, converted by the non-linear crystals, without change or whether to output a second harmonic wave laser pulse of a lower level energy.

MODE FOR INVENTION

An exemplary embodiment of an apparatus for stabilizing second harmonic wave laser pulse output in a laser system operated by pulses is described in detail with reference to the accompanying drawings.

Figure 1:
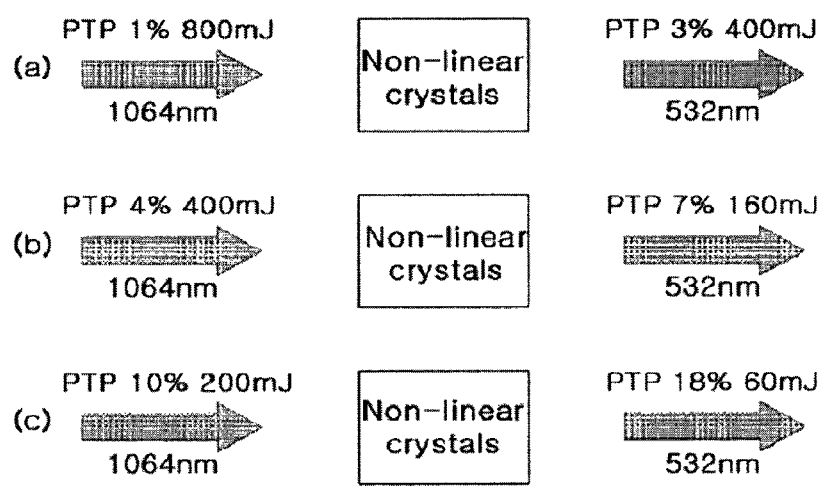
FIG. 1 is a conceptual diagram showing a process of converting the wavelength of a laser pulse, outputted from a common pulse laser oscillator, into half the wavelength using non-linear crystals.
Figure 2:
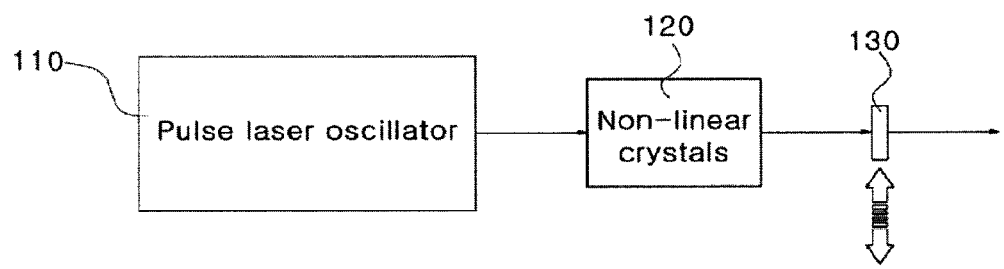
FIG. 2 is a block diagram of a second harmonic wave pulse output the apparatus for stabilizing in a laser system operated by pulses according to an embodiment of the present invention.
Figure 3:
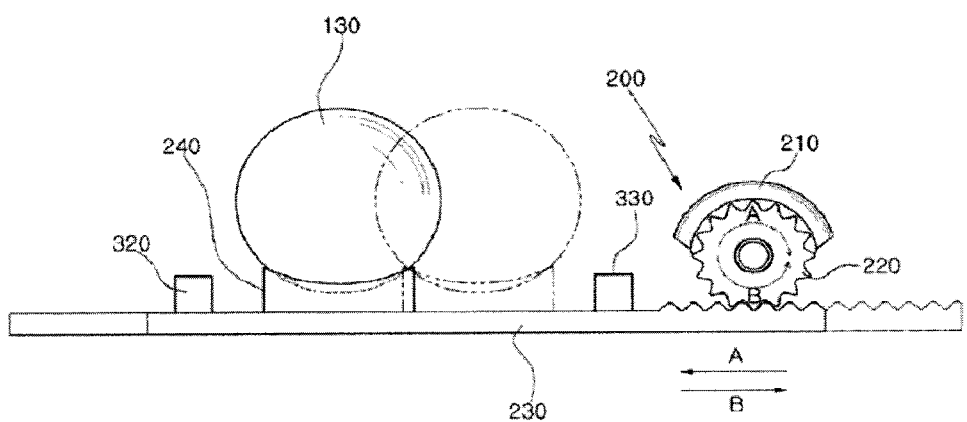
FIG. 3 shows the construction of linear motion means according to an embodiment of the present invention.
Figure 4:
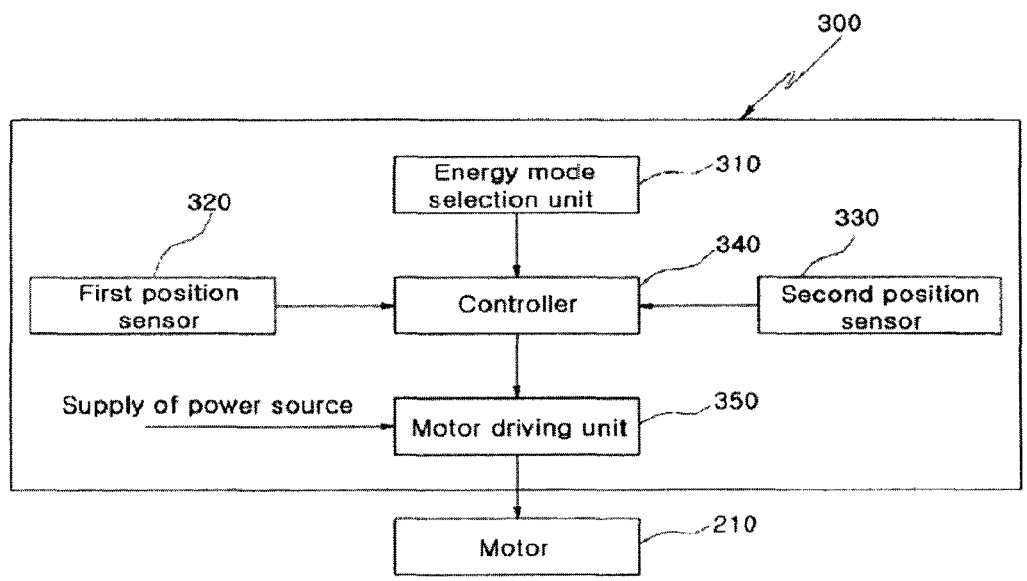
FIG. 4 is a detailed construction of a linear motion controller according to an embodiment of the present invention.
Figure 5:
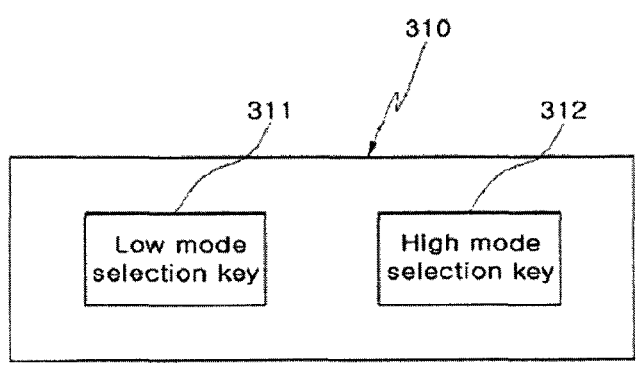
FIG. 5 is a detailed block diagram of an energy mode selection unit in FIG. 4.
Figure 6:
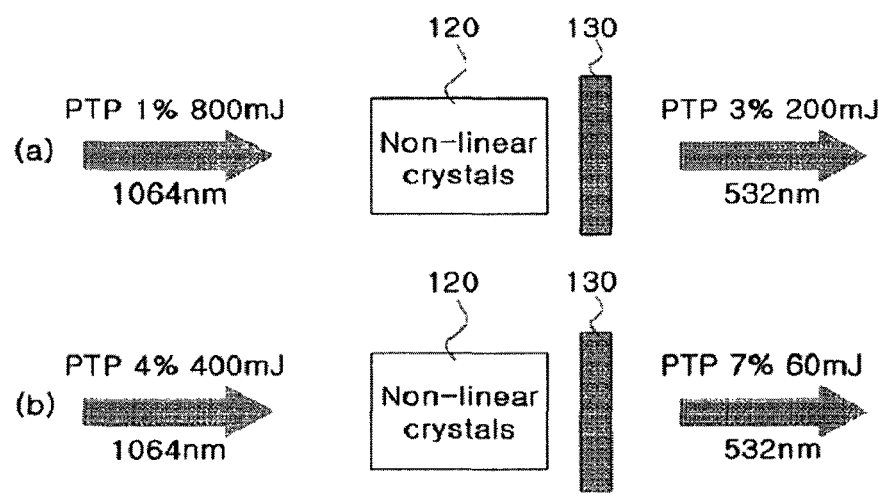
FIG. 6 is a conceptual diagram illustrating a process of converting the wavelength of a laser pulse, outputted from a pulse laser oscillator, into half the wavelength using non-linear crystals according to an embodiment of the present invention.

FIG. 2 is a block diagram of a second harmonic wave pulse output the apparatus for stabilizing in a laser system operated by pulses according to an embodiment of the present invention. FIG. 3 shows the construction of linear motion means according to an embodiment of the present invention. FIG. 4 is a detailed construction of a linear motion controller according to an embodiment of the present invention. FIG. 5 is a detailed block diagram of an energy mode selection unit in FIG. 4. FIG. 6 is a conceptual diagram illustrating a process of converting the wavelength of a laser pulse, outputted from a pulse laser oscillator, into half the wavelength using non-linear crystals according to an embodiment of the present invention.

As shown, the apparatus for stabilizing second harmonic wave pulse output in a laser system operated by pulses according to the embodiment of the present invention includes a pulse laser oscillator 110, non-linear crystals 120 for converting a laser pulse of a first wavelength, outputted from the pulse laser oscillator 110, into a laser pulse of a second harmonic wave having half the length of the first wavelength and outputting the converted laser pulse of the second harmonic wave, and a light absorption filter 130 for outputting a laser pulse having the second harmonic wave of lower energy by absorbing some of the energy of the laser pulse having the second harmonic wave converted by the non-linear crystals 120.

The pulse laser oscillator 110 may be implemented using various kinds of resonators which oscillate a pulse laser having a pulse width of, for example, a nano second band, a pico second band, or a femto second band.

The apparatus for stabilizing second harmonic wave pulse output in a laser system operated by pulses according to the embodiment of the present invention further includes linear motion means for selectively placing the light absorption filter 130 (that is, selectively inserting or detaching the light absorption filter 130) on a laser path by linearly moving the light absorption filter 130 and a linear motion controller 300 for controlling the linear motion of the linear motion means.

In the apparatus for stabilizing second harmonic wave pulse output in a laser system operated by pulses according to the embodiment of the present invention, the linear motion means includes a motor 210 rotated using a source power, a pinion 220 integrally rotated along with the motor 210 and configured to transfer the rotation of the motor 210, and a rack 230 configured to convert the rotational motion of the pinion 220 into a linear motion.

In the apparatus for stabilizing second harmonic wave pulse output in a laser system operated by pulses according to the embodiment of the present invention, a holder 240 is fixed to the rack 230 and integrally linearly moved along with the rack 230. The holder 240 fixes the position of the light absorption filter 130.

In the apparatus for stabilizing second harmonic wave pulse output in a laser system operated by pulses according to the embodiment of the present invention, the linear motion controller 300 includes an energy mode selection unit 310 for receiving energy of a second harmonic wave, a first position sensor 320 for outputting a first position signal when the light absorption filter 130 is placed on a laser path, a second position sensor 330 for detecting whether the light absorption filter 130 is detached from the laser path and generating a second position signal when the light absorption filter 130 is left from the laser path, a controller 340 for outputting an off-driving control signal in response to signals received from the first position sensor 320 and the second position sensor 330 and outputting an on-driving control signal based on energy of a second harmonic wave received from the energy mode selection unit 310, and a motor driving unit 350 for generating a motor driving signal for stopping the driving of the motor 210 in response to the off-driving control signal of the controller 340 and driving the motor 210 in response to the on-driving control signal of the controller 340.

In the apparatus for stabilizing second harmonic wave pulse output in a laser system operated by pulses according to the embodiment of the present invention, the energy mode selection unit 310 includes a low mode selection key 311 for inputting a key command to the controller 340 so that the light absorption filter 130 is placed on a laser path and a second harmonic wave of a low level energy (for example, 30 to 200 mJ) is outputted and a high mode selection key 312 for inputting a key command into the controller 340 so that the light absorption filter 130 placed on the laser path is detached from the laser path and a second harmonic wave of a high level energy (for example, 200 to 400 mJ) is outputted.

In the apparatus for stabilizing second harmonic wave pulse output in a laser system operated by pulses according to the embodiment of the present invention, the energy absorption factor of the light absorption filter 130 is 1% to 99%.

In the apparatus for stabilizing second harmonic wave pulse output in a laser system operated by pulses according to the embodiment of the present invention, the non-linear crystals 120 is made of any one selected from among KTP ($KTiOPO_4$), LBO ($LiB_3O_5$), or BBO ($BaB_2O_4$).

Figure 7:
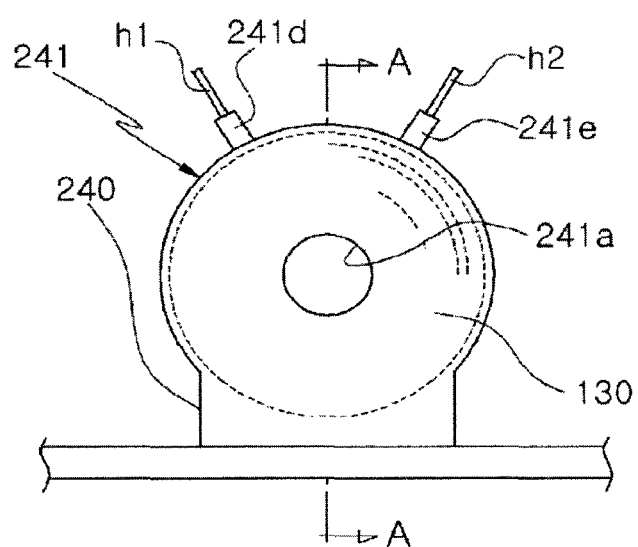
FIG. 7 shows the construction of a holder according to another embodiment of the present invention.
Figure 8:
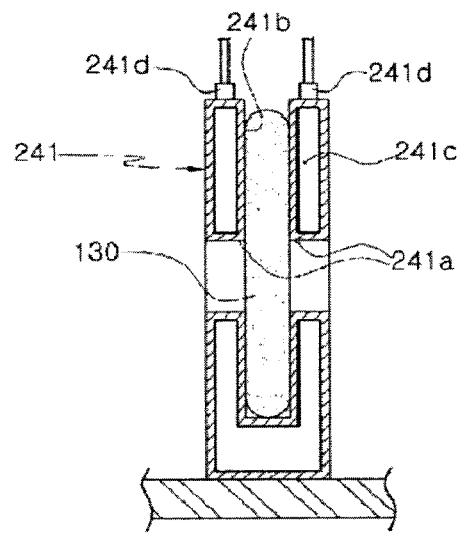
FIG. 8 is a cross-sectional view of line A-A in FIG. 7.

FIG. 7 shows the construction of a holder 241 according to another embodiment of the present invention, and FIG. 8 is a cross-sectional view of line A-A in FIG. 7.

As shown in FIGS. 7 and 8, in another embodiment of the present invention, the holder 241 is made of metal material having excellent thermal conductivity so that heat generated from the light absorption filter 130 can be smoothly generated. An insertion hole 241b is formed in the holder 241 made of metal material and is configured to contain the light absorption filter 130 so that the light absorption filter 130 is seated therein. The light absorption filter 130 is closely inserted into the insertion hole 241b so that heat can be smoothly dissipated through the holder 241 made of metal material. A through hole 241a is formed in the holder 241 of the metal material so that a laser pulse can pass therethrough.

When a second harmonic wave is received, the light absorption filter 130 converts the second harmonic wave into heat. That is, the amount of generated heat is changed according to the absorption factor (%). Accordingly, the light absorption filter 130 requires the holder 241 that functions as a heat-dissipation plate for cooling the light absorption filter 130 and also functions to attach the light absorption filter 130 to the holder 241. In the present embodiment, a structure capable of dissipating heat generated from the light absorption filter 130 is adopted.

Furthermore, in the apparatus for stabilizing second harmonic wave pulse output in a laser system operated by pulses according to the embodiment of the present invention, a coolant inflow port 241d for introducing a coolant therein is formed on one side of the holder 241, and a coolant outflow port 241e is formed on the other side of the holder 241. A hollow portion 241e is formed within the holder 241 so that the coolant introduced via the coolant inflow port 241d flows through the coolant outflow port 241e.

The coolant inflow port 241d is coupled to an external coolant supply hose h1 and configured to be supplied with the coolant. A coolant outflow hose h2 may be coupled to the coolant outflow port 241e in order to externally drain the thermally exchanged coolant.

The above construction is advantageous in that heat-dissipation efficiency can be further improved by the supply of a coolant.

Figure 9:
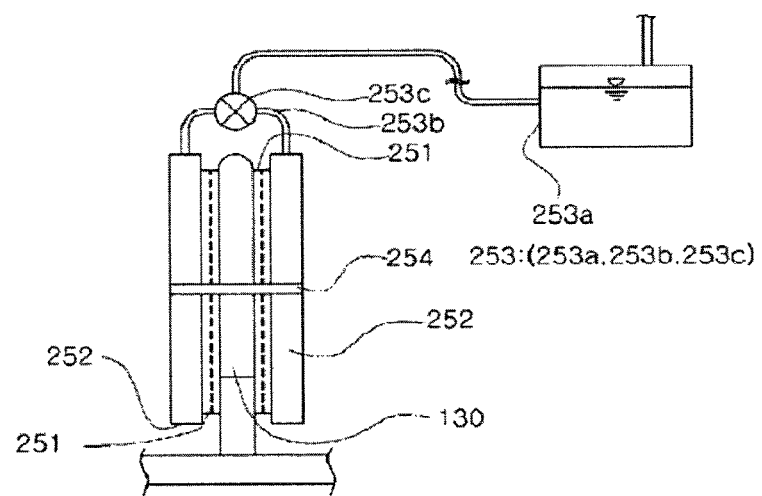
FIG. 9 shows the major elements of a second harmonic wave pulse output the apparatus for stabilizing in a laser system operated by pulses according to another embodiment of the present invention.

Meanwhile, a method of cooling the light absorption filter 130 is not limited to the above method using the holder made of metal material, but may be implemented using a method according to an embodiment shown in, for example, FIG. 9.

The method according to the embodiment shown in FIG. 9 is described in detail below.

FIG. 9 shows the major elements of an apparatus for stabilizing second harmonic wave pulse output in a laser system operated by pulses according to another embodiment of the present invention.

As shown in FIG. 9, the apparatus for stabilizing second harmonic wave pulse output in a laser system operated by pulses according to another embodiment of the present invention includes a thermoelectric device 251 configured to come in contact with a light absorption filter 130 and to absorb the heat of the light absorption filter 130 generated when power is supplied thereto, water jackets 252 made of metal material and configured to come in contact with the thermoelectric device 251 and to dissipate heat generated from the thermoelectric device 251 using a coolant supplied thereto, a coolant supply unit 253 configured to supply the coolant to the water jackets 252, and a fixing band 254 configured to couple the water jackets 252 and the light absorption filter 130.

Furthermore, the coolant supply unit 253 includes a coolant storage tank 253a for storing the coolant, a connection pipe 253b for coupling the coolant storage tank 253a and the water jackets 252, and a coolant pump 253c for forcedly supplying the coolant of the coolant storage tank 253a to the water jackets 252 through the connection pipe 253b.

According to the above construction, when the thermoelectric device 251 is generated, heat is absorbed by the light absorption filter 13. When the coolant pump 253c is operated, the coolant is introduced into the water jackets 252, thereby cooling the thermoelectric device 251.

A process of operating the apparatus for stabilizing second harmonic wave pulse output in a laser system operated by pulses is described below.

First, if it is sought to obtain second harmonic wave output of a low level energy (for example, 30 to 200 mJ), the low mode selection key 311 is selected.

When the low mode selection key 311 is pressed, the controller 340 recognizes a low mode setting command and generates the on-driving control signal for rotating the motor 210 in a direction A.

The motor driving unit 350 receives the on-driving control signal from the controller 340 and outputs the motor driving signal to the motor 210. In response to the motor driving signal, the motor 210 in the direction A. The motor driving signal is, for example, DC current having a polarity.

When the motor 210 is rotated in the direction A as described above, the pinion 220 is also rotated in the direction A. Consequently, the rack 230 is moved in the direction A in a linear line.

When the rack 230 is moved in the direction A in a linear line as described above, the light absorption filter 130 is placed on a laser path. The first position sensor 320 detects the light absorption filter 130 placed on the laser path and generates the first position signal.

The controller 340 receives the first position signal from the first position sensor 320 and outputs the off-driving control signal to the motor driving unit 350. In response to the off-driving control signal received from the controller 340, the motor driving unit 350 blocks current supplied from a power supply unit (not shown) to the motor 210, so that the driving of the motor 210 is stopped.

Here, the linear motion of the rack 230 is stopped, and the light absorption filter 130 is placed on the laser path in a right position.

When the light absorption filter 130 is placed on the laser path as described above, the light absorption filter 130 absorbs the energy of the laser pulse to a specific absorption factor (for example, 50%).

As shown in FIG. 6(a) and (b), PTP values oscillated in the pulse laser oscillator 110 are low (for example, 1% and 4%), and laser pulses having respective wavelengths of 1064 nm in a high level energy region (for example, 800 mJ and 400 mJ) are converted into wavelengths of 532 nm which is half the wavelength of 1064 nm while passing through the non-linear crystals 120. Accordingly, the laser pulses having energy levels of 200 mJ and 60 mJ are outputted while passing through the light absorption filter 130 having the specific absorption factor (for example, 50%).

An operation mode in which a second harmonic wave laser pulse of a high level energy having a low PTP value is outputted without a change in the amount of energy is described below.

When a user presses the high mode setting key 312, the controller 340 receives a high mode setting signal from the energy mode selection unit 310. In response to the high mode setting signal, the controller 340 outputs the on-driving control signal for rotating the motor 210 in a direction B to the motor driving unit 350.

The motor driving unit 350 receives the on-driving control signal from the controller 340. In response to the on-driving control signal, the motor driving unit 350 outputs the motor driving signal to the motor 210. At this time, the motor 210 and the pinion 220 are rotated in the direction B, so that the rack 230 is moved in the direction B in a linear line.

When the rack 230 is moved in the direction B in a linear line as described above, the light absorption filter 130 is detached from the laser path. When the light absorption filter 130 is fully detached from the laser path, the second position sensor 330 detaches the detachment of the light absorption filter 130 and generates a second position signal.

The controller 340 receives the second position signal and outputs the off-driving control signal to the motor driving unit 350 so that current supplied to the motor 210 is blocked and the driving of the motor 210 is stopped.

When the light absorption filter 130 is removed from the laser path through the above process, the laser pulse of a high level energy, converted from the non-linear crystals 120, is outputted without a change in the amount of energy.

Since the light absorption filter 130 can be selectively placed on a laser path in a right position and detached from the light path, a stabilized second harmonic wave laser pulse of a small or great energy region, having a low PTP value, can be obtained by making a fundamental wave laser pulse of a high level energy, having a low PTP value, incident on the non-linear crystals.

Meanwhile, the means for selectively placing the light absorption filter on a laser path may include a construction for selectively placing the light absorption filter on the light path by means of the rotational motion of rotational motion means, in addition to the linear motion means according to the present embodiment. In this case, the rotational motion means may include a circular plate and a motor for rotationally moving the circular plate. Furthermore, the light absorption filter is mounted on part of the outer circumference of the circular plate, and the laser path is placed at a point where the light absorption filter is placed outside the outer circumference of the circular plate. The motor of the rotational motion means is controlled by the controller. When the motor is rotated under the control of the controller, the light absorption filter on the outer circumference of the circular plate can be selectively placed on the laser path. The moving means for selectively placing the light absorption filter on the laser path as described above may be modified in various ways and not limited to the above embodiment.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An apparatus for stabilizing second harmonic wave pulse output in a laser system operating by pulses, the apparatus comprising:
   a pulse laser oscillator for outputting a first laser pulse;
   non-linear crystals for converting the first laser pulse having a first wavelength into a second laser pulse having a second wavelength being half the first wavelength and outputting the second laser pulse;
   a light absorption filter for absorbing energy of the second laser pulse and outputting a third laser pulse having an energy lower than the second laser pulse;
   moving means for moving the light absorption filter away from a laser path and selectively placing the light absorption filter on the laser path; and
   a control unit for controlling the moving means to adjust the energy of the second laser pulse according to a selected energy mode,
   wherein the control unit comprises:
      an energy mode selection unit for receiving the energy of the second laser pulse;
      at least one position sensor for outputting position signals of the light absorption filter;
      a controller for generating control signals to control the moving means based on the position signals and the energy of the second laser pulse wave received from the energy mode selection unit.

2. The apparatus of claim 1, wherein the moving means comprises:
   a motor rotated by a supplied power source;
   a pinion integrally rotated along with the motor and configured to transfer the rotation of the motor;
   a rack configured to convert the rotational motion of the pinion into a linear motion.

3. The apparatus of claim 2, further comprising a holder fixed to the rack and configured to linearly move along with the rack and to fix a position of the light absorption filter.

4. The apparatus of claim 1, wherein:
   the at least one position sensor outputs a first position signal when the light absorption filter is placed on a laser path and a second position signal when the light absorption filter is left from the laser path;
   the controller generates an off-driving control signal based on signals received from the first position sensor and the second position sensor and generates an on-driving control signal based on the energy of the second laser pulse; and
   the controller unit further comprises a motor driving unit for stopping the driving of the motor in response to the off-driving control signal and for generating a motor driving signal for driving the motor in response to the on-driving control signal.

5. The apparatus of claim 4, wherein the energy mode selection unit comprises:
   a low mode selection key for inputting a key command to the controller so that the light absorption filter is placed on the laser path and the third laser pulse is outputted; and
   a high mode selection key for inputting a key command to the controller so that the light absorption filter placed on the laser path is detached from the laser path and the second laser pulse is outputted.

6. The apparatus of claim 3, wherein:
   the holder is made of metal material and configured to smoothly dissipate heat generated from the light absorption filter,
   an insertion hole is formed in the holder of the metal material and configured to contain the light absorption filter and to have the light absorption filter seated therein,
   the light absorption filter is closely adhered to the insertion hole and inserted therein and configured to smoothly dissipate heat the through the holder, and
   a through hole through which the laser pulse can pass is formed in the holder of the metal material.

7. The apparatus of claim 6, wherein:
   a coolant inflow port into which a coolant is introduced is formed on one side of the holder,
   a coolant outflow port is formed on the other side of the holder, and
   a hollow portion is formed within the holder so that the coolant introduced via the coolant inflow port can flow through the coolant outflow port.

8. The apparatus of claim 1, further comprising:
   a thermoelectric device configured to come in contact with the light absorption filter and to absorb heat of the light absorption filter by means of a power source;
   water jackets made of metal material and configured to come in contact with the thermoelectric device and to dissipate heat radiated from the thermoelectric device using a supplied coolant; and
   a coolant supply unit configured to supply the coolant to the water jackets.

9. The apparatus of claim 8, further comprising a fixing band for fixing the thermoelectric device and the water jackets to the light absorption filter.

10. The apparatus of claim 8, wherein the coolant supply unit comprises:
    a coolant storage tank for storing the coolant;
    a connection pipe for coupling the coolant storage tank and the water jackets; and
    a coolant pump for forcedly supplying the coolant of the coolant storage tank to the water jackets through the connection pipe.

* * * * *